United States Patent [19]

Pold et al.

[11] 4,230,245
[45] Oct. 28, 1980

[54] PARCEL CARRIERS FOR MOTOR CYCLES

[76] Inventors: Juri Pold; Ilmar Pold, both of 24 Ozone Street, Alberton, Australia

[21] Appl. No.: 891,762

[22] Filed: Mar. 30, 1978

Related U.S. Application Data

[63] Continuation-in-part of Ser. No. 629,702, Nov. 6, 1975.

[51] Int. Cl.³ .................................................. B62J 7/04
[52] U.S. Cl. ..................................... 224/39; 224/32 A
[58] Field of Search ...................... 224/39 R, 40, 33 R, 224/33 A, 31, 32 R, 32 A, 30 R, 37, 38; 280/289 R, 289 A, 202

[56] References Cited

U.S. PATENT DOCUMENTS

| | | | |
|---|---|---|---|
| 460,332 | 9/1891 | Coates | 224/39 R |
| 1,030,844 | 6/1912 | Howell | 224/31 X |
| 3,625,405 | 12/1971 | Kezar et al. | 224/32 A |
| 3,791,563 | 2/1974 | Raat | 224/31 X |
| 3,850,353 | 11/1974 | Foulds | 224/31 |

FOREIGN PATENT DOCUMENTS

| | | | |
|---|---|---|---|
| 1120938 | 7/1956 | France | 224/39 R |
| 309083 | 6/1953 | Switzerland | 224/39 R |

Primary Examiner—Robert J. Spar
Assistant Examiner—Jerold M. Forsberg
Attorney, Agent, or Firm—Oldham, Oldham, Hudak & Weber

[57] ABSTRACT

A motorcycle carrier having the main components of which suitable for a large number of different makes and models of motorcycles. A parcel support frame and side supports cooperate with a stabilizing arm and inwardly extending bracket so that the carrier can be tailor-made for each variety of motorcycle. The various parts interlock to reduce concentration of forces on parts of the frame enabling efficient and most economical manufacture and assembly.

2 Claims, 4 Drawing Figures

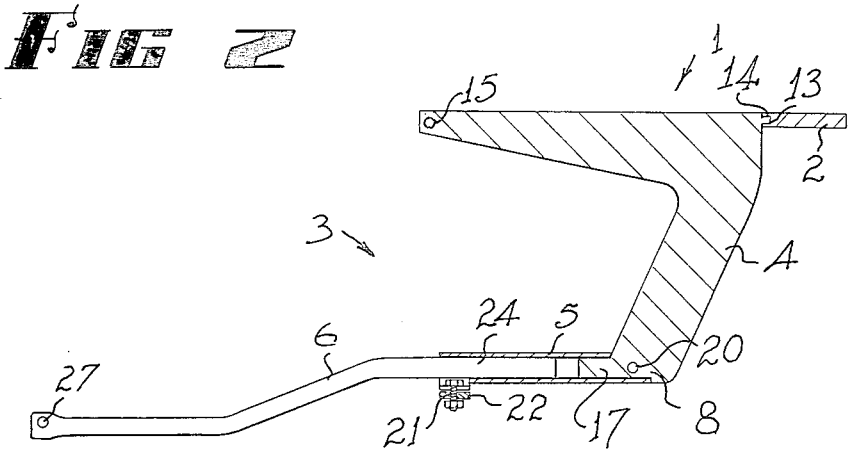
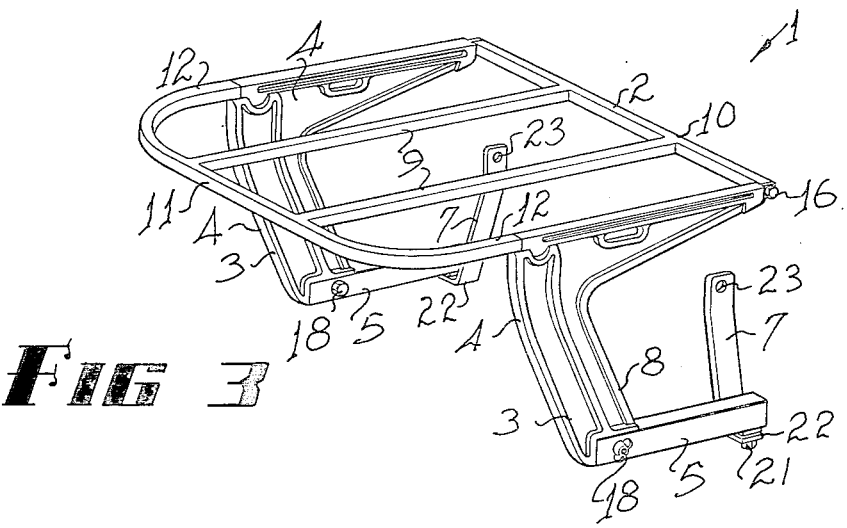
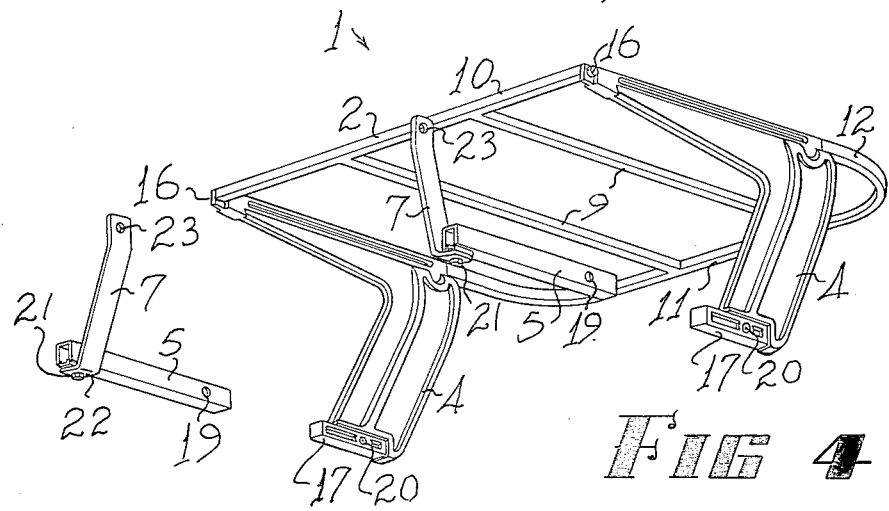

PARCEL CARRIERS FOR MOTOR CYCLES

This application is a continuation-in-part of U.S. Pat. application Ser. No. 629,702 filed Nov. 6, 1975.

BACKGROUND OF THE INVENTION

This invention relates to motor cycle carriers.

The invention to which this problem is generally directed is the cost of manufacture of carriers suitable for carrying parcels and such-like on motorcycles.

The problem is not so much one of the cost of manufacture of a carrier as such, but rather that associated with having to make for the end user a carrier suitable for one particular model of one particular type of motor cycle.

The problems here are enormous.

Those who are familiar with this art will understand that there many hundreds of differing models of motor cycles of the dozens of differing makers and that it has been conventional practice to tailor-make each carrier so that this will fit appropriately on one particular model of one particular manufacturer.

The cost here is firstly that a specific jig must be made and then some number of carriers must be manufactured which are then supplied to the various stores who must then take stock of each of the carriers for a large number of the models and makers. There is some hope that any particular retailer will be holding particular stock in one model of one maker.

It will be well appreciated firstly that retailers will be most reluctant to stock large numbers of carriers simply because of the capital investment involved. Secondly where these carriers are of the fixed side support type, the space requirements involved are great. Finally, the problem that any of the carriers may not be popular and there is an investment involved in stock which can easily become very dead.

There is the further problem, that for the manufacture of such carriers, it can hardly be justified to provide mass production techniques such as moulding, where the sales of that particular carrier are going to be limited. While separate fabrication of each carrier is relatively expensive, substantial capital cost otherwise necessary for mass production is not required and hence this has been generally considered to be the only feasible way for manufacture of such carriers.

The problems of the cost of carriers, the cost of inventorying carriers presently made, and the difficulties of supply will therefore be obvious enough. There are of course further difficulties when one attempts to overcome this problem, in that any carrier that must be designed has firstly to be able to be made strong enough to support substantial loads and yet at the same time be of good appearance when secured to a motor cycle, and perhaps almost as important, to enable the carrier to be used on the bike for a long period of time without mechanical deterioration.

SUMMARY OF THE INVENTION

The general object of this invention is to propose a concept by which the costs of making motor cycle carriers particularly for a variety of makes and models be cheaper than has hitherto been possible.

There is the further object to provide a mechanical arrangement that is very suitable for application, provides adequate strength, and can enable a good looking design to be achieved.

There is the further object that there be provided a system of support for a carrier which will assist in the long lasting of the mechanical parts of a carrier.

It is a further object to provide a concept whereby a major portion of a carrier can be made according to substantive mass production techniques and that only minor portions of the carrier need to be especially shaped or fabricated to make the carrier suitable for any type of model or make.

Clearly the invention will be better understood when reference is made to preferred embodiments and therefor reference is now made to drawings in which

IN THE DRAWINGS

FIG. 2 is a cross-sectional view of a side of a parcel carrier according to a second embodiment FIG. 3 is a perspective view slightly from behind and above of the second preferred embodiment, in this case however the stabilizing arms being removed, and FIG. 4 is a view of the same embodiment as is shown in FIG. 3 except in this case the view is from below and the extension arms have been exploded.

DESCRIPTION OF THE INVENTION

Figure 1:
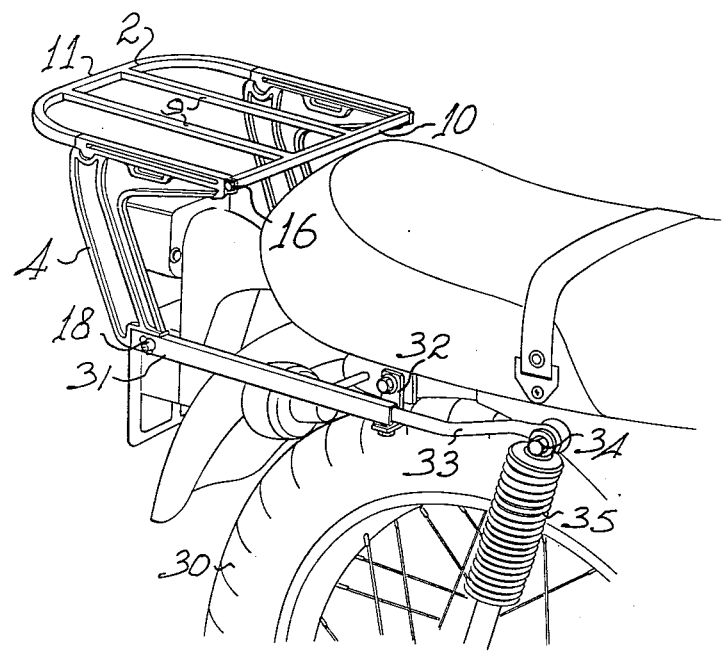
FIG. 1 is a perspective view showing a parcel carrier according to a first preferred embodiment in position on a motor cycle.

The invention in one form could be said to reside in a motor cycle parcel carrier of a type including a parcel support frame arranged to be held rearward of a motor cycle seat and above a rear wheel of a motor cycle, and side supports to provide sole support for the parcel support frame, each side support adapted to be located one to each side of the rear wheel of a motor cycle each side support being adapted to be held, at two spaced apart locations, by direct securement to the structure of the motor cycle, the parcel carrier being characterized according to this invention in that each of the side supports is comprised of separate portions, including a side strut having an upper portion interlocking with and therefore removably secured to the said parcel support frame, a stabilizing arm having a rearward portion interlocking with a lower portion of the side strut, and forward end of the stabilizing arm being so shaped as to be adapted to be secured to an upper end of a shock absorber of the motor cycle, and a bracket secured in a removable manner at an outer end to the lower forward portion of the side strut and extending inwardly from the secured outer end to an inner which is adapted by reason of its shape to be secured directly to the structure of the motor cycle.

The discovery associated with this invention is that, by having firstly a bracket and secondly a stabilizing arm which connect the motor cycle to the carrier or at least a major portion of the carrier, the carrier in each case can be made according to very standard techniques and can be universally used over a large number of motor cycle makes and models, and the bracket and stabilizing arm in each case can be specifically tailored to the particular make or model.

The important feature then is that the bracket and stabilizing arm are a very small proportion of the whole of the cost, can easily be fabricated by pressing or easy manufacturing techniques so that a person in a retail store need only hold a very small number of parcel support frames and side struts and they may hold the very much cheaper brackets and stabilizing arms appropriate for a much larger variety of motor cycles which however will cost only a very small proportion of the otherwise full cost.

The invention can also be said to reside in the combination of a motor cycle parcel carrier when secured to a motor cycle, for instance when there is a parcel support carrier located above a rear wheel of the motor cycle and rearward of the seat of the motor cycle, the parcel support frame being solely supported by two side supports, one to each side of the motor cycle, the side support in each case having an upper end secured to the parcel support frame and having at a lower end a portion extending forwardly, said portion comprising a stabilizing arm which is secured at a forward end to the motor cycle by a bolt engaging the frame of the motor cycle which also engages and holds the upper end of a shock absorber extending and functioning between the main frame of the motor cycle and the rear wheel assembly of the motor cycle, and a rearward end which interlocks with, in separable manner, a lower portion of the side support strut, and a bracket secured, in removable manner, at an outer end, to a lower portion of the side support strut and at an inner end, in removable manner, to the frame of the motor cycle.

It is a preferred feature that the stabilizing arm interlocks with the lower portion of the side support by sliding means arranged to allow relative freedom of movement in a forward to rearward orientation between the stabilizing arm and the side support strut, but to lock the side strut against any rotational freedom of movement where this is about any transverse horizontal axis relative to the stabilizing arm.

It has been discovered that there is value in leaving some relative movement potential between some of the members of the carrier when held on the motor cycle especially where this relates to preferred embodiments and it has been found that this has the advantage of reducing stresses on critically stressed portions of the carrier as will be described in particular during the particular description of the preferred embodiment.

It has been a further preferred feature that each side support strut includes at a lower end an extension arm interlocking at a rear end of the arm with this side upright arm, these two constituting the side support strut, and the outer end of the bracket being secured at a forward end of the extension arm.

It is especially preferred that the extension arm is a member of tubular shape where interlocking with the side upright arm is achieved by a forward pointing spigot forming part of the side upright arm engages with a close fit, the rearwardly otherwise open end of the extension arm.

The extension arm of course includes the means to support the bracket which extends inwardly, and by providing a separate member which is an extension arm the distance forwardly or rearwardly of the inwardly directed bracket can be varied and hence the relative position of the parcel support frame relative to the seat of the motor cycle.

This then provides that there is even greater universality for any given frame design while still not adding considerably to the cost of the specific portions which must be especially uniquely fabricated for each model or make.

It is to be noted that the extension arm can be of two or three specific sizes only so perhaps two or three such lengths of extension arm can be manufactured which does allow this once again to be made according to mass production techniques.

It is of course a preferred feature that each side support is removably secured to the parcel support frame.

It is particularly preferred that each side support include a rearwardly pointing pin engaging within a correspondingly shaped and located socket in the parcel support frame, and at a location forward of the pin and socket joint, a bolt passes through an aperture in the side support and threadably engages the parcel support frame holding thereby the side support to the parcel support frame.

The special advantage of this last feature is that there need only be one bolt to each side which needs to be tightened and this will hold the parcel carrier together in a relatively secure manner with minimal undue strain.

Furthermore it allows for a very simple frame arrangement for the parcel support frame and allows this article to be manufactured once again according to the economic mass production techniques without difficulty.

Referring now in detail to the drawings and referring in particular to FIGS. 2, 3 and 4 there is shown a parcel carrier 1 which includes a parcel support frame 2, side supports 3, the side supports 3 being adapted to provide sole support for the parcel support frame 2 and there being one side support attached to each side of the parcel support frame 2.

Each side support includes a side upright arm 4, an extension arm 5, a stabilizing arm 6 and an inwardly extending bracket 7.

The assembly of the side upright arm and the extension arm shall be referred for the sake of simplicity as the side strut 8.

The parcel support frame is cast from aluminium and includes two longitudinal struts 9 and at a forward end a transverse strut 10 and at a rearward end a transverse strut 11 with curved ends 12.

Each side upright arm 4 is moulded from cast aluminium in the shape generally as shown in the drawing, the upper end of which is adapted to interlock with the parcel support frame and accordingly there is a rearwardly pointing pin 13 and a forwardly open socket 14 within the frame end in each case a portion 12 of transverse strut 11 whereby the pin 13 will nest securely within the socket 14.

The forward end of the side upright arm 4 includes a transverse aperture 15 and a bolt 16 passes through this and threadably engages a threaded aperture (not shown) within the front transverse strut 10.

It will be seen in this way that there is a very simple interlocking method which can be held in very tight securement by one bolt in the case of each side support.

Furthermore this system of interlocking allows for easy casting of the respective members.

At the lower end of the side upright arm 4 is an extension arm 5 which is of a square cross-section tube held in place by a forward pointing spigot 17 forming part of the side upright arm 4 engaging within, with a close fit, the rearwardly otherwise open end of the extension arm 5.

The stabilising arm is being held by the extension arm 5 locked in position with respect to the spigot 17 by a bolt 18 passing through correspondingly positioned apertures 19 and 20.

At a forward end of the extension arm 5 there is secured a downwardly extending bolt 21 which engages and holds an outer end 22 of bracket 7.

The bracket 7 extends inwardly and upwardly and terminates with an aperture in its end, the aperture being referred to as 23, this bracket 17 shaped so as to provide an appropriate fitting location for a selected model and make of motor cycle.

In the same way the extension arm 5 is of such a length this length being selected to be appropriate to a particular model or make of motor cycle.

The stabilizing arm 6 interlocks with the extension arm 5 by reason of its shape being formed of a tubular metal member the diameter of which corresponds to the internal distance apart of the sides of the tubular shape of the extension arm 5 so that there is a sliding fit of the rearward end of the stabilizing arm 6 this being referred to as 24.

The length of the rearward end of the stabilizing arm within the extension arm is sufficient as is especially shown in FIG. 2 to provide sliding freedom which of course then allows for relative freedom of movement in a fore to aft rearward orientation between the stabilizing arm and the side support 3, but this arrangement will ensure that the assembly will be locked against any rotational freedom of movement where this is about any transverse horizontal axis relative to the stabilizing arm 6.

The forward end 27 of the stabilizing arm 6 is adapted to be secured by a bolt by reason of there being an aperture 28 to an upper end of a motor cycle shock absorber fixing assembly.

Referring now to FIG. 1 there is shown an assembly of a motor cycle carrier actually secured in position rearward and above a rear wheel of a motor cycle 30.

In this case, it will be seen that the parcel support frame 2 and the side upright arm 4 are the same as is shown in the examples of FIGS. 2, 3 and 4 but in this case an extension arm 31 is fitted in the manner as is shown in FIGS. 2, 3 and 4. In this case of somewhat greater length than that previously seen and in the same way, there is an inwardly extending bracket 32 of somewhat smaller size than the inwardly extending bracket 7 and further more there is a forwardly extending stabilizing arm 33 which has its forward end held by bolt 34 to an upper assembly of a shock absorber 35 which is actively functional between a rear swinging wheel assembly of the motor cycle and its frame.

It will now be seen that what has been provided is a system whereby with very small cost, a widely varying range of models and makes of motorcycles can be fitted with components for making a parcel carrier which has the major components which can be manufactured according to well known massed production techniques such as moulding.

The side upright arms 4 can also be made from moulded plastic.

There is special advantage in the fact that the stabilizing arm 33 is retained with only a sliding fit within the forwardly open end. This ensures that where there is vibrational reaction caused between the inertia of the parcel carrier and the motor cycle engine, the forces will be spread over the contact area between the stabilizing arm 33 and the internal areas of the conduit of the extension arm 31.

It is conventional in prior carriers to find that there can be some weakness in the vicinity of such arms and by leaving the freedom to slide between the stabilizing arm and the extension arm has had substantive advantage in reducing such pressure concentrations and hence fracture for this reason.

It is to be noted that it has been found best to make the stabilizing arm and the extension arm in each case from metal.

We claim:

1. A parcel carrier for motor cycles of various sizes employing a parcel support frame of one uniform size arranged to be held rearward of a motor cycle seat and above a rear wheel of a motor cycle of any conventional size at a shock absorber of said cycle, said frame having associated therewith side supports arranged to provide sole support for the parcel frame, said side supports being positioned on each side of said frame, to be on each side of the rear wheel of said motor cycle and be secured to the structure of the motor cycle at two spaced apart locations wherein: each of the side supports is comprised of separable portions including a side strut; said side strut having an upper portion interlocking with and being removably secured to said frame; a stabilizing arm sized for use with said motor cycle; said stabilizing arm having a rearward portion and a forward end, said rearward portion interlocking with and being separable from a lower portion of the side strut and said forward end being secured to an upper end of said shock absorber of the motor cycle, and a bracket sized for use with the said motor cycle secured at an outer end in a removable manner to a lower forward portion of said side strut and extending inwardly from its secured outer end to an inner end which is adapted to be secured directly to the structure of the motor cycle; and wherein said side strut has a forwardly extending extension arm thereon, with a forwardly open bore formed therein, said stabilizing arm having its rearward portion telescopically received in said open bore and arranged to allow relative freedom of movement in a forward to rearward orientation between the stabilizing arm and the side support to adjust the parcel carrier to the size of the said motor cycle, and being further arranged to lock the side support against any substantive rotational freedom of movement about any transverse horizontal axis relative to the stabilizing arm.

2. A motor cycle parcel carrier as claimed in claim 1 comprising: a side upright arm forming a part of said side strut, said extension arm being telescopically secured at a rear end thereof to said side upright arm and extending forwardly therefrom, said inwardly extending bracket being secured to a forward end of the extension arm.

* * * * *